(12) United States Patent
Iwamoto et al.

(10) Patent No.: US 7,925,767 B2
(45) Date of Patent: Apr. 12, 2011

(54) DEVICE ACCESS BASED ON CENTRALIZED AUTHENTICATION

(75) Inventors: Neil Y Iwamoto, Mission Viejo, CA (US); Attullah Seikh, Irvine, CA (US); Jeanette Y Paek, Cypress, CA (US); Martin Martinez, Huntington Beach, CA (US); Royce E Slick, Mission Viejo, CA (US); Wei-Jhy Chern, Irvine, CA (US); Eliza Khosrova, Los Angeles, CA (US); Joseph Yang, Cypress, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/320,134

(22) Filed: Jan. 21, 2009

(65) Prior Publication Data

US 2009/0133104 A1 May 21, 2009

Related U.S. Application Data

(63) Continuation of application No. 10/017,438, filed on Dec. 5, 2001, now Pat. No. 7,487,233.

(51) Int. Cl.
G06F 15/16 (2006.01)
(52) U.S. Cl. ........................................ 709/229; 709/223
(58) Field of Classification Search .................. 370/352; 709/202
See application file for complete search history.

(56) References Cited

U.S. PATENT DOCUMENTS

| | | | |
|---|---|---|---|
| 5,172,396 A | 12/1992 | Rose et al. | 375/356 |
| 5,191,611 A | 3/1993 | Lang | 705/53 |
| 5,421,011 A | 5/1995 | Camillone et al. | 718/104 |
| 5,457,746 A | 10/1995 | Dolphin | 705/51 |
| 5,483,596 A | 1/1996 | Rosenow et al. | 713/167 |
| 5,513,126 A | 4/1996 | Harkins et al. | 709/228 |
| 5,544,236 A | 8/1996 | Andruska et al. | 379/201.02 |
| 5,583,914 A | 12/1996 | Chang et al. | 455/466 |
| 5,647,056 A | 7/1997 | Barrett et al. | 709/220 |
| 5,657,446 A | 8/1997 | Pinard et al. | 379/90.01 |
| 5,671,354 A | 9/1997 | Ito et al. | 395/187.01 |
| 5,758,072 A | 5/1998 | Filepp et al. | 709/220 |

(Continued)

FOREIGN PATENT DOCUMENTS

EP 863658 9/1998

(Continued)

OTHER PUBLICATIONS

"Removal Policies in Network Caches for World-Wide Web . . . ", Williams, Abrams. (1996) ei.cs.vt.edu/~succeed/96sigcomm/96sigcomm.ps.gz.

(Continued)

*Primary Examiner* — Thong H Vu
(74) *Attorney, Agent, or Firm* — Fitzpatrick, Cella, Harper & Scinto

(57) ABSTRACT

Access control to a networked peripheral device by a walk-up user, wherein the networked peripheral device is accessible by both the walk-up user and a remote user, based on centralized access management information. Access control comprises receiving authenticated information for the walk-up user from the networked peripheral device at a centralized location, determining at the networked peripheral device a level of access to the networked peripheral device by the walk-up user based on received access management information for the walk-up user, and allowing the walk-up user to access the determined user-available features of the networked peripheral device based on the determined level of access.

12 Claims, 13 Drawing Sheets

U.S. PATENT DOCUMENTS

| | | | |
|---|---|---|---|
| 5,774,551 A | 6/1998 | Wu et al. | 713/155 |
| 5,819,047 A | 10/1998 | Bauer et al. | 709/229 |
| 5,869,825 A | 2/1999 | Ziarno | 235/380 |
| 5,907,598 A | 5/1999 | Mandalia et al. | 379/100.01 |
| 5,923,756 A | 7/1999 | Shambroom | 713/156 |
| 5,968,124 A | 10/1999 | Takahashi et al. | 709/224 |
| 5,969,316 A | 10/1999 | Greer et al. | 235/375 |
| 5,978,450 A | 11/1999 | McAllister et al. | 379/88.02 |
| 5,995,729 A | 11/1999 | Hirosawa et al. | 703/1 |
| 6,028,838 A | 2/2000 | Yamamura et al. | 370/229 |
| 6,029,198 A | 2/2000 | Iizuka | 709/223 |
| 6,031,904 A * | 2/2000 | An et al. | 379/201.02 |
| 6,041,325 A | 3/2000 | Shah et al. | 707/10 |
| 6,070,192 A | 5/2000 | Holt et al. | 709/227 |
| 6,076,166 A | 6/2000 | Moshfeghi et al. | 713/201 |
| 6,085,081 A | 7/2000 | Leskinen | 455/406 |
| 6,088,451 A | 7/2000 | He et al. | 713/201 |
| 6,115,696 A | 9/2000 | Auger | 705/28 |
| 6,119,230 A | 9/2000 | Carter | 713/200 |
| 6,125,283 A | 9/2000 | Kolev et al. | 455/552.1 |
| 6,128,602 A | 10/2000 | Northington et al. | 705/35 |
| 6,161,185 A | 12/2000 | Guthrie et al. | 726/5 |
| 6,173,406 B1 | 1/2001 | Wang et al. | 726/3 |
| 6,202,092 B1 | 3/2001 | Takimoto | 709/225 |
| 6,216,009 B1 | 4/2001 | Barnett | 455/510 |
| 6,219,700 B1 | 4/2001 | Chang et al. | 709/224 |
| 6,223,292 B1 | 4/2001 | Dean et al. | 726/28 |
| 6,243,451 B1 | 6/2001 | Shah et al. | 379/201.03 |
| 6,289,450 B1 | 9/2001 | Pensak et al. | 713/167 |
| 6,363,411 B1 * | 3/2002 | Dugan et al. | 709/202 |
| 6,378,070 B1 | 4/2002 | Chan et al. | 713/155 |
| 6,416,414 B1 | 7/2002 | Stadelmann | 463/42 |
| 6,425,005 B1 | 7/2002 | Dugan et al. | 709/223 |
| 6,442,547 B1 | 8/2002 | Bowman-Amuah | 707/10 |
| 6,470,025 B1 | 10/2002 | Wilson et al. | 370/462 |
| 6,484,145 B1 | 11/2002 | Home et al. | 705/8 |
| 6,498,912 B1 | 12/2002 | Leni et al. | 399/79 |
| 6,505,300 B2 | 1/2003 | Chan et al. | 713/164 |
| 6,519,232 B1 | 2/2003 | Becher | 370/314 |
| 6,557,049 B1 | 4/2003 | Maloy et al. | 710/8 |
| 6,564,128 B2 | 5/2003 | Baird et al. | 701/33 |
| 6,567,396 B1 | 5/2003 | Pohjanvouri et al. | 370/349 |
| 6,587,873 B1 | 7/2003 | Nobakht et al. | 709/219 |
| 6,604,085 B1 | 8/2003 | Kolls | 705/14 |
| 6,609,198 B1 | 8/2003 | Wood et al. | 713/155 |
| 6,625,258 B1 | 9/2003 | Ram et al. | 379/88.13 |
| 6,640,239 B1 | 10/2003 | Gidwani | 709/203 |
| 6,643,318 B1 | 11/2003 | Parsa et al. | 375/141 |
| 6,645,077 B2 | 11/2003 | Rowe | 463/42 |
| 6,674,537 B2 | 1/2004 | Kadowaki | 358/1.15 |
| 6,674,545 B1 | 1/2004 | Atsumi | 358/1.9 |
| 6,678,515 B1 | 1/2004 | Gillespie et al. | 455/412.1 |
| 6,678,826 B1 | 1/2004 | Kelly et al. | 713/201 |
| 6,678,827 B1 | 1/2004 | Rothermel et al. | 726/6 |
| 6,716,103 B1 | 4/2004 | Eck et al. | 463/45 |
| 6,732,176 B1 | 5/2004 | Stewart et al. | 709/227 |
| 6,738,856 B1 | 5/2004 | Milley et al. | 710/315 |
| 6,782,396 B2 | 8/2004 | Greene et al. | 707/104.1 |
| 6,785,728 B1 | 8/2004 | Schneider et al. | 709/229 |
| 6,789,077 B1 | 9/2004 | Slaughter et al. | 707/10 |
| 6,789,126 B1 | 9/2004 | Saulpaugh et al. | 709/245 |
| 6,801,902 B1 | 10/2004 | David | 707/1 |
| 6,802,007 B1 | 10/2004 | Canelones et al. | 713/193 |
| 6,804,716 B1 | 10/2004 | Koch et al. | 709/225 |
| 6,810,527 B1 | 10/2004 | Conrad et al. | 725/76 |
| 6,820,204 B1 | 11/2004 | Desai et al. | 726/6 |
| 6,829,332 B2 | 12/2004 | Farris et al. | 379/88.02 |
| 6,832,194 B1 | 12/2004 | Mozer et al. | 704/270.1 |
| 6,848,045 B2 | 1/2005 | Long et al. | 726/20 |
| 6,850,252 B1 | 2/2005 | Hoffberg | 715/716 |
| 6,850,977 B2 | 2/2005 | Barnhouse et al. | 709/224 |
| 6,889,321 B1 | 5/2005 | Kung et al. | 713/153 |
| 6,901,374 B1 | 5/2005 | Himes | 705/14 |
| 6,904,449 B1 | 6/2005 | Quinones | 709/203 |
| 6,934,842 B2 | 8/2005 | Okamoto et al. | 713/168 |
| 6,947,985 B2 | 9/2005 | Hegli et al. | 709/224 |
| 6,971,018 B1 | 11/2005 | Witt et al. | 713/187 |
| 6,985,244 B1 | 1/2006 | Bhogal et al. | 358/1.15 |
| 7,006,487 B1 * | 2/2006 | Ma et al. | 370/352 |
| 7,010,607 B1 | 3/2006 | Bunton | 709/228 |
| 7,024,487 B2 | 4/2006 | Mochizuki et al. | 709/238 |
| 7,035,900 B2 | 4/2006 | Yamaguchi et al. | 709/205 |
| 7,079,640 B2 | 7/2006 | Mikhailov et al. | 379/230 |
| 7,092,950 B2 | 8/2006 | Wong et al. | 707/100 |
| 7,120,926 B1 | 10/2006 | Safadi et al. | 725/132 |
| 7,145,686 B2 * | 12/2006 | Simpson et al. | 358/1.18 |
| 7,167,919 B2 | 1/2007 | Iwamoto et al. | 709/229 |
| 7,277,398 B1 | 10/2007 | Makipaa | 370/252 |
| 2001/0042124 A1 | 11/2001 | Barron | 709/227 |
| 2001/0054152 A1 | 12/2001 | Nakao et al. | 713/182 |
| 2002/0010679 A1 | 1/2002 | Felsher | 705/51 |
| 2002/0016727 A1 | 2/2002 | Harrell et al. | 705/7 |
| 2002/0032655 A1 | 3/2002 | Antonin et al. | 705/43 |
| 2002/0042880 A1 | 4/2002 | Endoh | 713/182 |
| 2002/0049846 A1 | 4/2002 | Horen et al. | 709/226 |
| 2002/0058530 A1 | 5/2002 | Akama | 455/556 |
| 2002/0063154 A1 | 5/2002 | Hoyos et al. | 235/382.5 |
| 2002/0072414 A1 | 6/2002 | Stylinski et al. | 463/42 |
| 2002/0073066 A1 | 6/2002 | Coutts et al. | 707/1 |
| 2002/0073213 A1 | 6/2002 | Mekata et al. | 709/229 |
| 2002/0077980 A1 * | 6/2002 | Chang et al. | 705/40 |
| 2002/0087710 A1 | 7/2002 | Aiken et al. | 709/232 |
| 2002/0094067 A1 | 7/2002 | August | 379/88.01 |
| 2002/0113995 A1 | 8/2002 | Evans et al. | 358/1.15 |
| 2002/0128986 A1 | 9/2002 | Stutz | 705/401 |
| 2002/0142831 A1 | 10/2002 | Mattice et al. | 463/29 |
| 2002/0149467 A1 | 10/2002 | Calvesio et al. | 340/5.52 |
| 2002/0161831 A1 | 10/2002 | Nakaoka et al. | 709/203 |
| 2002/0174030 A1 | 11/2002 | Praisner et al. | 705/26 |
| 2002/0180581 A1 | 12/2002 | Kamiwada et al. | 340/5.2 |
| 2002/0194003 A1 | 12/2002 | Mozer | 704/270.1 |
| 2003/0018900 A1 | 1/2003 | Endoh | 713/182 |
| 2003/0028798 A1 | 2/2003 | Burnett | 713/200 |
| 2003/0030584 A1 | 2/2003 | Hirata et al. | 342/357.12 |
| 2003/0046231 A1 | 3/2003 | Wu | 705/43 |
| 2003/0046548 A1 | 3/2003 | Brown et al. | 713/182 |
| 2003/0055876 A1 | 3/2003 | Korata et al. | 709/203 |
| 2003/0131073 A1 | 7/2003 | Lucovsky et al. | 709/219 |
| 2003/0149765 A1 | 8/2003 | Hubbard et al. | 709/224 |
| 2004/0034794 A1 | 2/2004 | Mayer et al. | 713/200 |
| 2004/0111709 A1 | 6/2004 | Furst et al. | 717/131 |
| 2004/0122730 A1 | 6/2004 | Tucciarone et al. | 705/14 |
| 2004/0193513 A1 | 9/2004 | Pruss et al. | 705/30 |
| 2004/0250083 A1 | 12/2004 | Schwab | 713/182 |
| 2005/0080679 A1 | 4/2005 | Barton et al. | 705/16 |
| 2005/0114366 A1 | 5/2005 | Mathai et al. | 707/100 |
| 2005/0233744 A1 | 10/2005 | Karaoguz et al. | 455/432.3 |
| 2005/0273863 A1 | 12/2005 | Nakao et al. | 726/26 |
| 2006/0159109 A1 | 7/2006 | Lamkin et al. | 370/401 |
| 2006/0161635 A1 | 7/2006 | Lamkin et al. | 709/217 |

FOREIGN PATENT DOCUMENTS

| | | |
|---|---|---|
| EP | 929023 | 4/1999 |
| EP | 935182 | 8/1999 |
| EP | 1130497 | 9/2001 |
| EP | 1193593 | 4/2002 |
| EP | 1320008 | 6/2003 |
| JP | 406169283 | 6/1994 |
| JP | 8-235114 | 9/1996 |
| JP | 9-130532 | 5/1997 |
| JP | 11-296327 | 10/1999 |
| JP | 2001-16383 | 1/2001 |
| JP | 2001-297045 | 10/2001 |
| JP | 2002-202945 | 7/2002 |
| JP | 2002-259108 | 9/2002 |
| JP | 2003-78956 | 3/2003 |
| WO | 01/65768 | 9/2001 |

OTHER PUBLICATIONS

"Team-Partitioned, Opaque-Transition Reinforcement Leraning", Stone, Veloso (1998) www.cs.cmu.edu/afs/cs/usr/pstone/public/papers/98ml/rl-dt.ps.Z.

"Jocaml: mobile agents for Objective-Caml", Conchon (1999) para. inria.fr/~lefessan/biblio/papers/00064-CLF99.ps.gz.

"Dynamic Quota-based Admission Control with Subrating in . . . ", Cheng, Chen, Chen (2000) vtopis.cs.vt.edu/~irchen/ps/acm-ms2000.pdf.

"Multi-Resolution Access Control Algorithm Based on Fractal . . . ", Roche, Dugelay, Molva (1996) clip.informatik.uni-leipzig.de/toelke/Watermark/1499.pdf.

"A Practical Approach to High Assurance Multilevel . . . ", Froscher, Kang, et al. (1994) www.itd.nrl.navy.mil/ITD/5540/publications/CHACS/1994/1994froscher--acsac.ps.

"Designing object-oriented synchronous groupware with . . . ", Schuckmann, Kirchner, et al. (1996) ftp.darmstadt.gmd.de/pub/concert/publications/CSCW96.ps.

"Software Architecture of the Infopad System", Le, Seshan, Burghardt, Rabaey (1994) daedalus.cs.berkeley.edu/publications/mobidata.ps.gz.

"The Digital Distributed System Security Architecture", Gasser, al. (1989) www.cs.virginia.edu/.about.humphrey/GridComputingClass/papers/DigitalDSSArchitecture.ps.

"Parallel auditory filtering by sustained and transient channels separates coarticulated vowels and consonants" Cohen, MA.; Grossberg, S.; Speech and Audio Processing, IEEE Transactions on vol. 5, Issue 4, Jul. 1997 pp. 301-318.

"The LR33020 GraphX processor: a single chip X-terminal controller", Tobias, R.; Compcon Spring '92. Thirty-Seventh IEEE Computer Society International Conference, Digest of Papers. Feb. 24-28, 1992 pp. 358-363.

"Printers are dangerous", Hernandex, J.C..; Sierra, J.M.; Fonzalez-Tablas, A.; Orfila, A.; Security Technology, 2001 IEEE 35th International Carnahan Conference on Oct. 16-19, 2001 pp. 190-196.

* cited by examiner

DEVICE ACCESS BASED ON CENTRALIZED AUTHENTICATION

This application is a continuation of application Ser. No. 10/017,438, filed Dec. 5, 2001, the contents of which are incorporated herein by reference.

BACKGROUND OF THE INVENTION

1. Field of the Invention

The invention relates to a centralized authentication mechanism. More particularly, the invention relates to use of a centralized authentication mechanism for providing user privileges information to a networked peripheral device.

2. Description of the Related Art

Networked peripheral devices are typically multifunction devices that handle functions such as printing, scanning, copying or faxing and are often relied upon in performing enterprise level tasks. Controlling usage of a networked peripheral device means that a walk-up user of the device, i.e., one that gains access to the device locally at the device, or a remote user of the device, i.e., a non walk-up user, is allowed access to only those services and/or features available on the device that are authorized. For example, a user may have access to copying but not a printing service of a networked peripheral device that offers faxing, printing, copying and scanning services. Likewise, a user may only be allowed access to a black-and-white, but not a color printing feature of the printing service offered by the device.

Controlling usage of services and/or features offered by a networked peripheral device is often necessary for economic as well as other reasons. For example, color ink cartridges containing ink for color printing typically cost significantly more than black ink cartridges that are used for black and white printing. It may therefore be desirable to limit access to color printing features of a printer in order to save costs.

One conventional approach to controlling access to a networked peripheral device by a non-enterprise user is to program each device separately as to the access privileges of the user. This approach requires presence of an input mechanism such as a keyboard or a magnetic card reader on the device through which the user logs into the device. Following login by the user, the device examines the user's access privileges, which are maintained by the device, and allows the user access to the device based on the programmed information concerning the user's access privileges. Adoption of this approach is cumbersome since it requires separate programming of each networked peripheral device and reprogramming of each device in response to changes in access policy.

Another conventional approach to controlling access to a networked peripheral device by a non-enterprise user is to program user access privileges on a keycard that is carried by the user. Upon swiping the keycard on a card reader installed on the device, the user access policy is transmitted from the card to the device. The user is then allowed to use the device in accordance with the limitations contained in the user access policy. This approach also suffers from the drawback suffered by the previous alternative in that each individual card needs to be programmed in order to encode user access policy and reprogrammed each time the policy is revised as to that user. It would therefore be beneficial to be able to control and customize access to services and/or features of a networked peripheral device by a non-enterprise user using a centralized mechanism, which provides both enterprise user authentication and non-enterprise user authentication and access privilege information to manage device/resource usage, at the enterprise level.

SUMMARY OF THE INVENTION

The present invention addresses the above inadequacies by providing a centralized level of access management to networked peripheral devices for both walk-up and remote users in order to prevent unauthorized use by a non-enterprise user of services and/or features that are available on a device based on authentication of the user at the device.

In one aspect, the invention concerns creating a context-sensitive user interface for a networked peripheral device. The user supplies authentication information to a device via any input means including, but not limited to, a keypad, a smart card, or any other input method that is supported by the device. The device communicates the authentication information provided by the user to an authentication server, which provides authentication services for both walk-up and remote for users of the device, and where networked peripheral device access policy information for users is stored. Access policy information is in turn transmitted to the device, which determines the level of access of a user based on the received access policy information.

The access policy information may concern access to a service offered by the networked peripheral device itself or to certain features of services available on the device. Upon authentication of the user by the authentication server, the information (e.g., privilege information or other access policy information) about the user's level of access to the device is passed back to the device. The device determines the user's access to services/features of the device based on the privilege information supplied by the authentication server. The device can create a customized user interface such as a customized service menu for the user that incorporates access policy information for the user. The customized service menu is then displayed on the device, allowing the user access to the determined features.

Providing a centralized location for access management information for use by a networked peripheral device in order to prevent unauthorized use of device services/features based on authentication of the user addresses the current problems associated with controlling access to a networked peripheral device by a walk-up user and eliminates the need for individual programming of each device or keycard in response to changes in access policy.

This brief summary has been provided so that the nature of the invention may be understood quickly. A more complete understanding of the invention can be obtained by reference to the following detailed description of the preferred embodiment(s) thereof in connection with the attached drawings.

DETAILED DESCRIPTION OF THE PREFERRED EMBODIMENT

Figure 1:
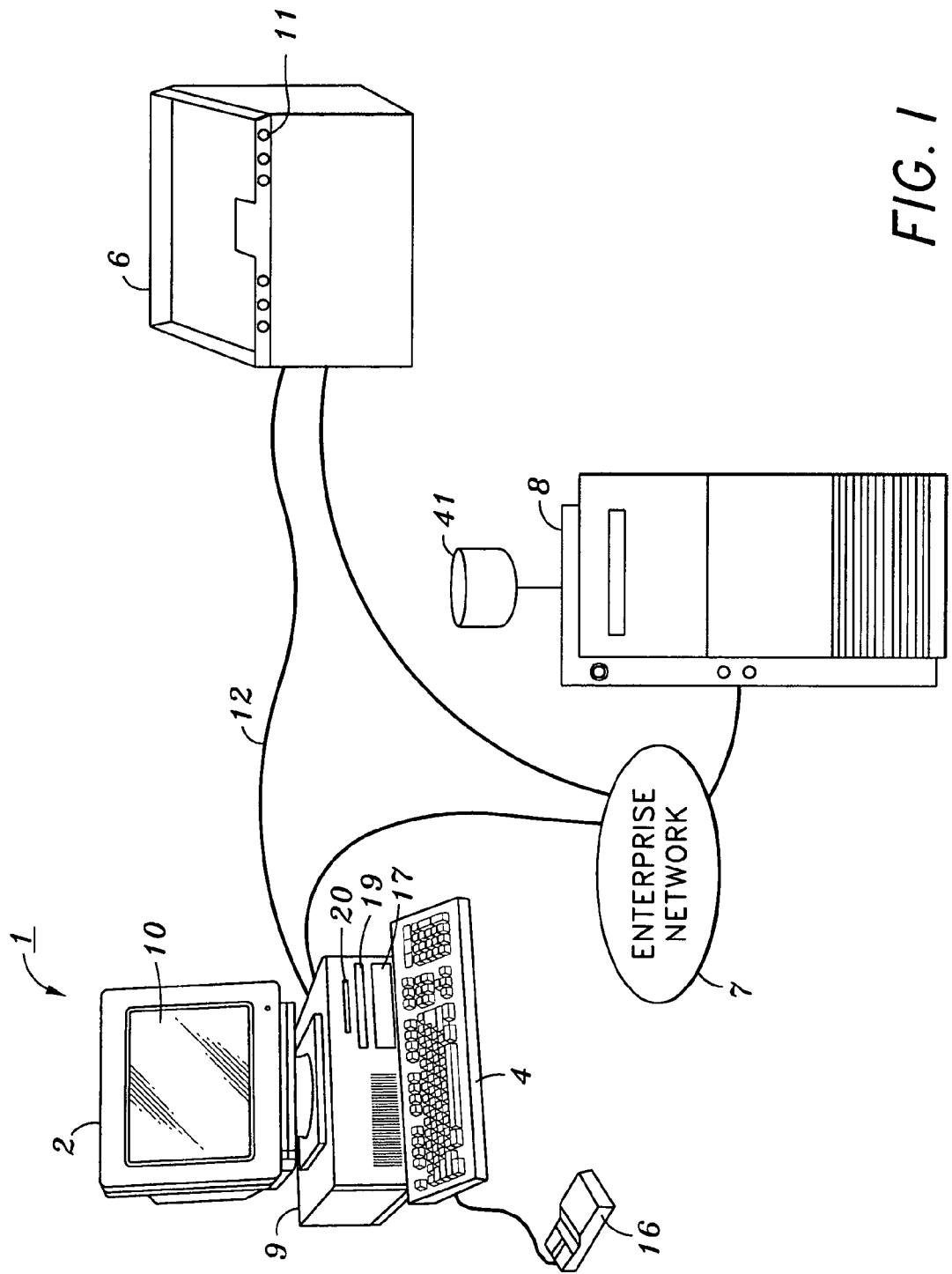
FIG. 1 is a view showing the outward appearance of a representative hardware embodying the present invention.

FIG. 1 is a view showing the outward appearance of a representative hardware embodying the present invention. Computing equipment 1 includes host processor 9 comprising a personal computer (hereinafter "PC") preferably having windowing operating system such as Microsoft Windows 2000®, Windows ME®, etc. operating system. Provided with the computing equipment 1 are color monitor 2 including display screen 10, keyboard 4 for entering text data and user commands, and pointing device 16. Pointing device 16 preferably comprises a mouse, for pointing, selecting and manipulating objects displayed on display screen 10.

Computing equipment 1 includes a computer-readable memory medium such as a fixed disk 17 and/or floppy disk drive 20 and/or CD-ROM drive 19. Such computer readable memory media allow computing equipment 1 to access information such as user-related data, computer executable process steps, application programs, and the like, stored on removable and non-removable memory media. In addition, computing equipment 1 is connected to server 8 through an enterprise network 7 and can acquire information and application programs from the server 8 through network 7. Enterprise network is preferably an Intranet but can also be a Local Area Network (LAN), a Wide Area Network (WAN) or the Internet, for example. The computing equipment 1 is connected to networked peripheral device 6 through the network 7. Device 6 includes one or more buttons 11, which may be programmable. As is discussed in more detail below, buttons 11 may be enabled or disabled by device 6 depending on the received access policy.

Like computing equipment, server 8 is a computer preferably having a windowing operating system. The server 8 has a storage device 41, which is preferably a large fixed disk for storing files. While device 41 is shown to be external to server 8, it need not be. Other devices on the network 7 can therefore use the server 8 as a file server and for storing applications such as an authenticator configured to authenticate a user and for storing user and device configuration information on a directory service, which is described in more detail with reference to FIG. 3, and which directory service contains such information as user account information and access policy information. The directory service is preferably a Microsoft Active Directory, which is a component of the Windows 2000® that provides directory services to a Windows environment. In addition to providing for central management and sharing of information on network resources and users, Microsoft Active Directory® acts as the central authority for network security that will be discussed below with reference to FIG. 4.

The interface between the directory service, which contains authentication and access policy information, and other components is provided by the authenticator, a component of server 8, which is responsible for authenticating users and providing access management information stored on the directory service. The authenticator is preferably located on server 8 with the directory service, but can also be implemented on a remote system, or server.

Figure 2:
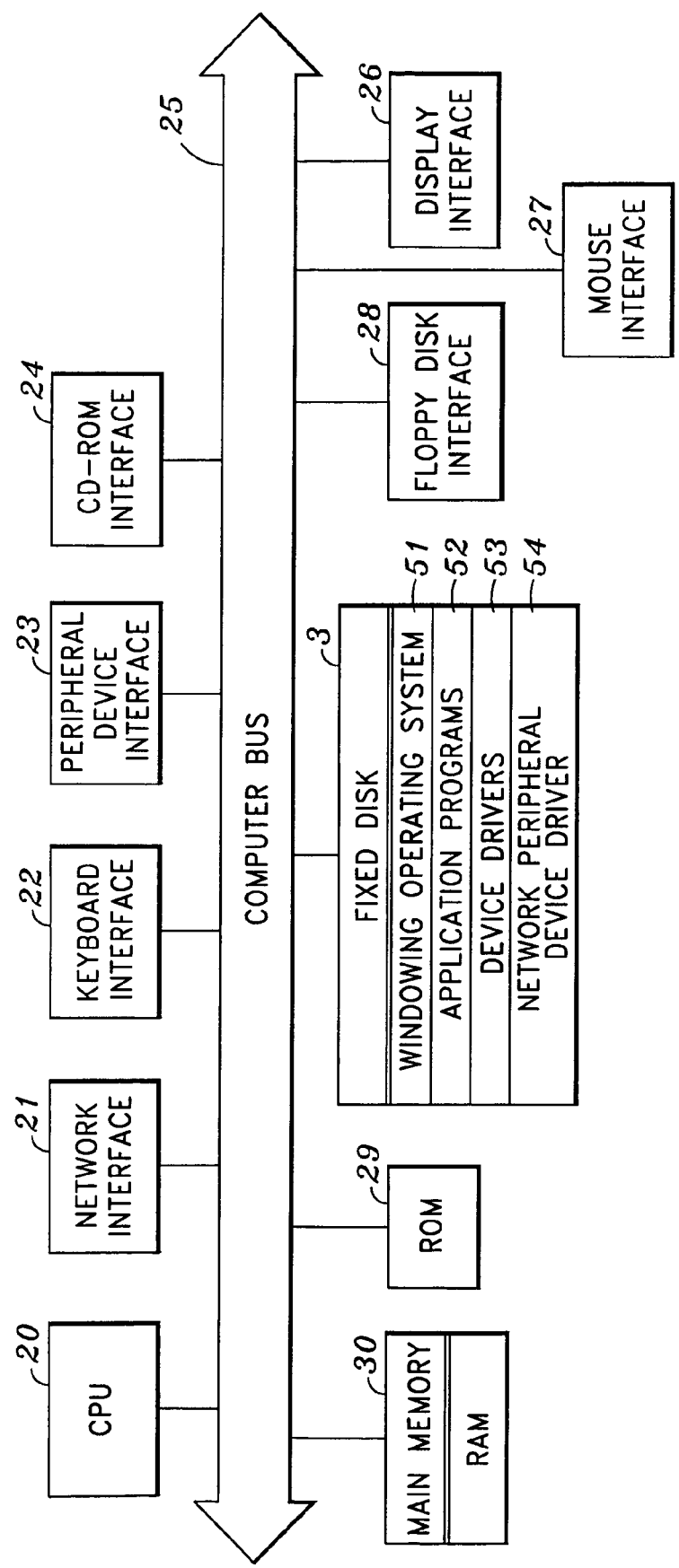
FIG. 2 is a detailed block diagram showing the internal architecture of the computer shown in FIG. 1 in accordance with the present invention.

FIG. 2 is a detailed block diagram showing the internal architecture of computing equipment 1. As shown in FIG. 2, computing equipment 1 includes central processing unit ("CPU") 20 that interfaces with computer bus 25. Also interfacing with computer bus 25 are fixed disk 3, network interface 21 for accessing network 7, random access memory ("RAM") 30 for use as main memory, read only memory ("ROM") 29, floppy disk interface 28, CD-ROM interface 24, display interface 26 to monitor 10, keyboard interface 22 to keyboard 4, mouse interface 27 to pointing device 16, and peripheral device interface 23 to a stand alone, non-networked device 6.

Main memory 30 interfaces with computer bus 25 so as to provide RAM storage to CPU 20 during execution of software programs such as the operating system, application programs, and device drivers. More specifically, CPU 20 loads computer-executable process steps from disk 3 or other memory media into a region of main memory 30, and thereafter executes the stored process steps from main memory 30 in order to execute software programs. Data can be stored in main memory 29, where the data can be accessed by CPU 20 during execution. As also shown in FIG. 2, fixed disk 3 contains a windowing operating system 51, application programs 52 such as application word processing, spreadsheet, database, imaging, graphics, etc. applications, and device drivers 53 such as networked peripheral device driver 54.

Figure 3:
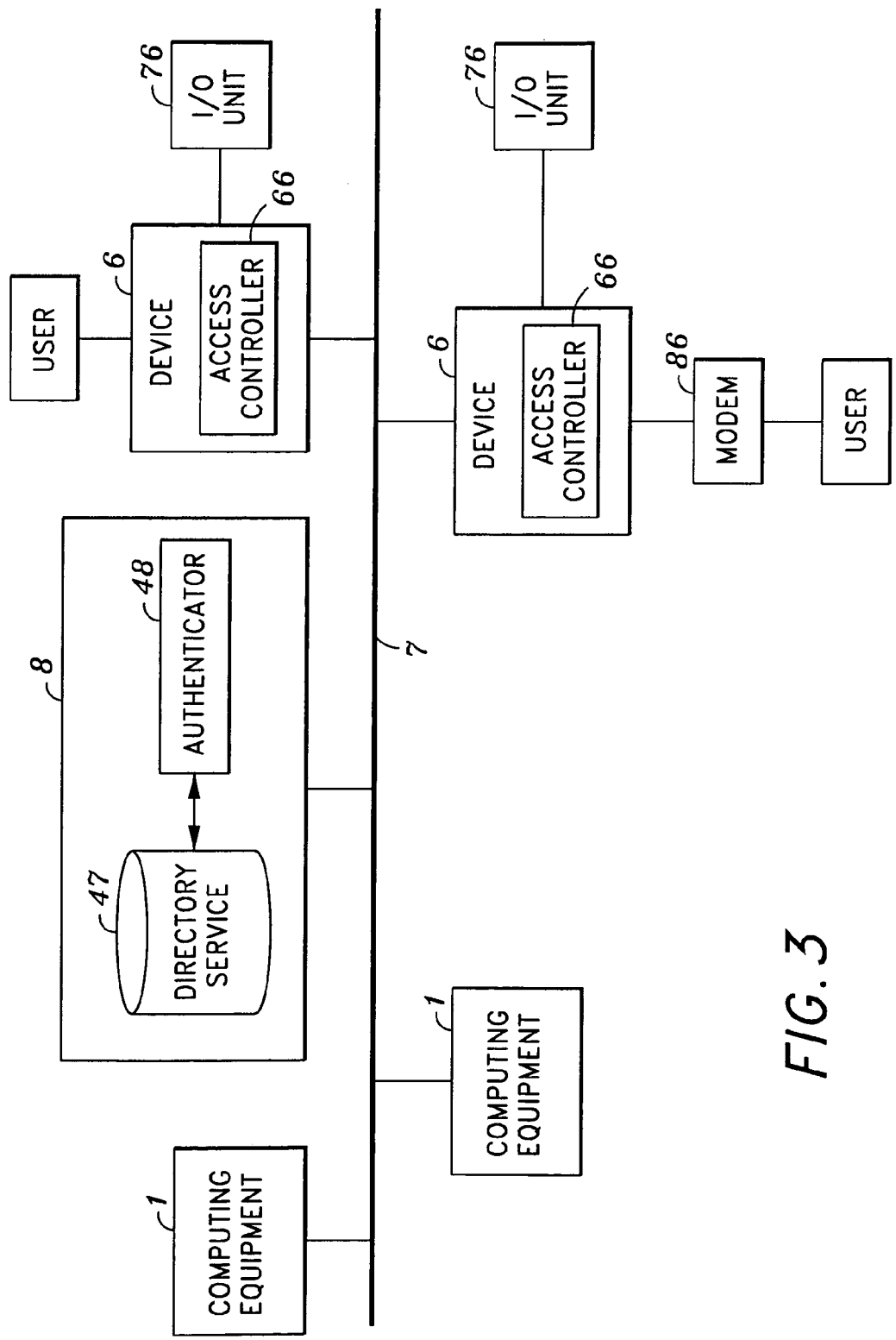
FIG. 3 is a block diagram showing an overview of components for use in managing and/or controlling access to network peripheral devices according to the present invention.

FIG. 3 is a block diagram showing an overview of components for use in managing and/or controlling access to network peripheral devices according to the present invention. Briefly, server 8 includes a host processor (not shown) that has a windowing operating system. The server 8 uses storage device 41, which is a preferably a large fixed disk for storing numerous files, to store directory service 47. Directory service 47 contains user access policy information and other information such as user authorization information. Access policy information refers to access control information (e.g., rules) that has been defined at an enterprise level concerning user access to services/features available on the networked peripheral device 6. For example, a user may have access to a copying but not a printing service of a multifunction networked peripheral device 6 that offers faxing, printing, copying and scanning services. Likewise, a user may only be allowed access to a black-and-white printing feature, but not a color printing feature, of a printing service available on the device 6.

The device 6 includes an access controller 66, which allows the user to access the device consistent with the determined level of access. Access controller is preferably an embedded computer system with an internal architecture similar to that shown in FIG. 2 including some or all of the interfaces shown. The access controller 66 controls user access to services/features available on the device 6 based on the access policy information provided to it by server 8. Access controller 66 may enforce the access policy associated with a user through creation of a user interface that is customized according to the user's level of access. Alternatively, access controller 66 may disable/enable buttons (e.g., button 11) on or displayed by, device 6. Of course, a combination of a user interface and buttons disabling/enablings may also be used. Device 6 further comprises the components needed to perform the services/features of the device 6. In a case of a multifunction device, for example, device 6 further comprising scanning, printing, faxing and copying components.

According to FIG. 3, the server 8 is connected to the computing equipment 1 and to networked peripheral device 6 through an enterprise network 7. The networked peripheral device 6 is preferably a multifunction device that offers faxing, copying, printing and scanning services but may be any type of networked peripheral device. Each of services offered by networked peripheral devices may include associated features. For example, printing may be available in color and black-and-white; scanning may be available in color, black-and-white and be available at various resolution levels. The following is an example of a structure of an enterprise access policy for use with a multi-functional networked peripheral device, which includes access/privilege information at both the service and feature levels.

| Services | Features | Policy |
|---|---|---|
| Print | B/W | Y/N |
| | Color | Y/N |
| | Daily Quota (Pages) | 0-2000 |
| Scan | B/W | Y/N |
| | Color | Y/N |
| | Resolution | L, H/L, H |
| | Daily Quota (Pages) | 0-100 |
| Fax | Local | Y/N |
| | Long Distance | Y/N |
| | Resolution | H, H/L, L |
| | Daily Quota (Pages) | 0-200 |
| Copy | B/W | Y/N |
| | Color | Y/N |
| | Resolution | H, H/L, L |
| | Daily Quota (Pages) | 0-1500 |

In the above example, the print service includes black-and-white (i.e., B/W), color and daily quota features. The information under the policy column identifies whether or not the feature is available and/or a number from zero to two thousand that represents a daily quota (e.g., a number of pages) the number of pages the user is allowed. For example, a user may be limited to printing 200 pages in a single day.

In addition to features that are similar to those of the print service, the scan service is available at high (H), medium (H/L), and low (L) resolutions as indicated under the policy column (i.e., H, H/L, L). The daily quota feature for the scan service is between zero and one hundred pages. The Fax service includes local, long distance, and daily quota features. The information under the policy column identifies whether or not the feature is available and/or a number from zero to two hundred that represents the number of pages the user can fax. In addition to the features that are similar to those of the print service, the copy service is available at various H, H/L and L resolutions that are indicated under the policy column. The information under the policy column identifies whether or not the feature is available and/or a number from zero to two hundred that represents the number of pages the user can copy.

After the authenticator 48 has tested the user authentication information against the access policy information and transmitted the result back to the device 6, the access controller 66 determines the user's level of access to services/features available on the device 6 based on the access policy information received from the authenticator 48. The access controller 66 preferably enforces the enterprise access policy for the user by creating a customized user experience (e.g., customized UI, customized service menu) for the user. The customized service menu is then displayed on the device 6. Input/Output (I/O) unit 76 on the networked peripheral device 6 provides the customized service menu. I/O unit 76 may be an external unit that is attached to the device 6 but may also be built into the device 6, and may provide a display unit as well as input mechanism (e.g., keyboard and/or media reader).

The customized service menu allows the user to use the determined services and/or features available on the networked peripheral device 6 in accordance with enterprise access policy information for the user. The customized service menu is preferably displayed on a touch-screen that allows the user to activate the keys by touching virtual keys that are displayed on the screen on which the menu is displayed. In such a case, the user may gain access to the device 6 by activating the virtual keys that are displayed on the I/O unit 76 corresponding to available services/features on the device 6. However, keys can also be activated through other means such as use of a pointing device 16, where I/O unit 76 comprises computing equipment 1.

Generally, the I/O unit that is used at the device 6 can be non-integrated where the input and output functions are performed by separate units. For example, I/O unit 76 may comprise a separate keypad. I/O unit can also be integrated where the same unit performs both input and output functions. For example, I/O unit may be a touch screen that displays output including virtual keys that are activated in response to the user's touch.

A user of the networked peripheral device 6 can be a walk-up user or a remote user. A walk-up user is defined as one who gains access to the device 6 locally at the device. A remote user is a non-walk-up user. In the case of the walk-up user, as discussed in more detail with respect to FIG. 4, the authentication information received by device 6 is transmitted from the device 6 to the authenticator 48 and device 6 receives access information policy from the authenticator 48. In the case of the remote user who may have already logged on to the network, device driver 54 requests access policy information that corresponds to the user and device 6 and provides authenticator 48 with user login and device information.

The authenticator 48 transmits access policy information to device driver 54. Authenticator 48 notifies device 6 of access policy associated with the authenticated user preferably along with the job, which was submitted by the user via device driver 54. If authenticator 48 is unable to authenticate a user based on the authentication information sent by device 6, it may send an "authentication failed" message or a "no services/features available," message, or both. Where the user is authenticated, the authenticator 48 forwards the access policy information along with the job request to the device 6.

The device 6 then processes the job request to the extent it conforms to the access policy information.

Figure 4:
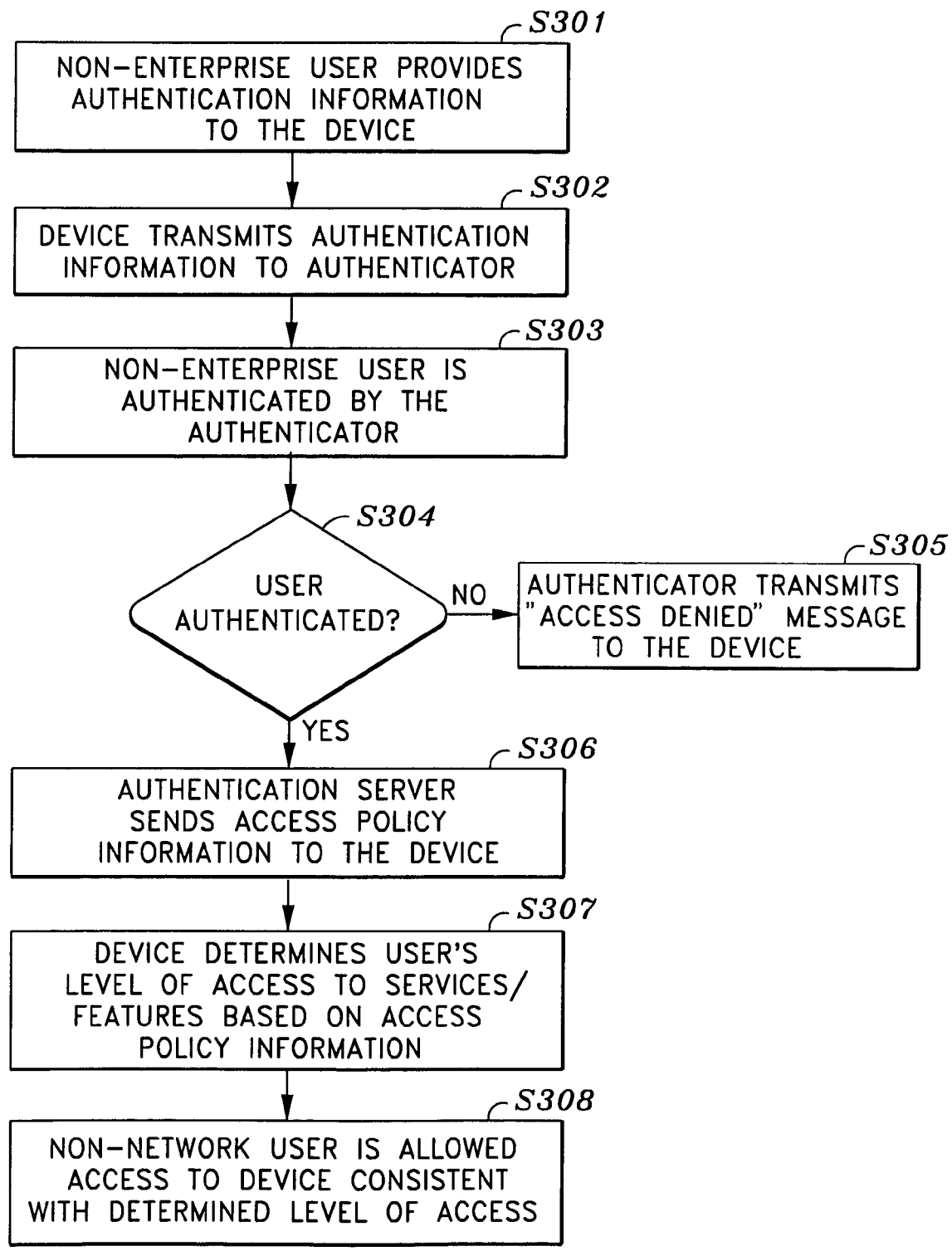
FIG. 4 illustrates a flow diagram of process steps to manage and/or control access to a networked peripheral device by a walk-up user according to the present invention.

FIG. 4 illustrates a flow diagram of process steps to manage and/or control access to a networked peripheral device by a walk-up user according to the present invention. Before allowing the user to access the device 6, the request must be vouched for by a trusted application such as the authenticator 48, which is stored on the server 8. All authentication information is kept in a directory service 47 that exists on the server 8. A user initiates a job by providing authentication information to the networked peripheral device 6. The user can use any of the services that are available on the networked peripheral device 6, for which the user is authorized, and any feature corresponding to any of those services such as black-and-white or color features of a printing service, for which the user is authorized.

Since a walk-up user accesses the device directly, in step S301 a walk-up user provides authentication information to the device 6. Preferably, a single, universal sign-on functionality is in effect according to which the authentication information is the user's username and password. In any case, the same authentication information may be used to authenticate a user for other purposes (e.g., access to server 8, or files stored thereon). Advantageously, a universal sign-on avoids entry of separate, unique user names/passwords for login at the device 6 and for any other purposes for which authentication is a prerequisite.

Step S302 causes the device 6 to communicate the authentication information provided by the user to the authenticator 48, which in turn determines if the user is an authorized user. The authenticator 48 accomplished this in step S303 by comparing or testing the authentication information provided by the user to access policy information stored in directory service 47. The enterprise access policy for the user may also be stored on the directory service 47 on the server 8.

Step S304 determines whether the user has been successful or unsuccessful in obtaining authentication from the authenticator 48. If the user is unsuccessful in obtaining authentication for the job request, the authenticator 48 preferably communicates this failure through an "access denied" message that is transmitted to the device 6 per step S305. If the user is successful in obtaining authentication, then in step S306 the authenticator 48 sends access policy information for the user back to the device 6.

The communication between the device 6 and the server 8 is conducted through a secure communication that minimizes chances of unauthorized access to the device by hackers. The preferred security mechanism implements an encryption mechanism for communications between the server 8 and the device 6. The encryption is preferably performed such that access information is stored at the directory service 47 in an encrypted form utilizing a cryptographic signing operation. The encrypted access policy information is then retrieved and sent by the authenticator 48 in an encrypted form to device 6, which decrypts the information upon receipt. In addition to encrypting access policy information, device 6 may encrypt authentication information before sending it to server 8.

Although the encryption is preferably performed such that the information stored at the directory service 47 is encrypted, it can alternatively be stored in non-encrypted form at the directory service 47. Accordingly, access policy information is stored in a non-encrypted form at the directory service 47 and is encrypted at the authenticator 48. Similarly, although the preferred security mechanism is an encryption mechanism, other feasible security mechanisms include transmission with secure socket layer ("SSL") capabilities, use of propriety protocols for communications between the server 8 and the device 6, and use of propriety mechanisms in connection with standard protocols.

Once the device 6 obtains the user access policy information from the authentication server 8, the access controller 66 proceeds in step S307 to determine user access to services and/or features offered by the device 6 based on the access policy information received from the authenticator 48. The following is an example of user access policy information for a multi-functional networked peripheral device:

| Services | Features | Policy |
| --- | --- | --- |
| Print | B/W | Y |
| | Color | Y |
| | Daily Quota | 150 |
| Scan | B/W | Y |
| | Color | N |
| | Resolution | L |
| | Daily Quota | 50 |
| Fax | Local | Y |
| | Long Distance | N |
| | Resolution | H/L, L |
| | Daily Quota | 25 |
| Copy | B/W | Y |
| | Color | N |
| | Resolution | H, H/L, L |
| | Daily Quota | 500 |

In the above example, user is allowed to use both black-and-white and color features of the print service up to a daily maximum of 150 pages. The user can use the scan service for scanning up to 50 pages of black-and-white pages per day at low resolution, fax up to 25 pages a day as long as the faxes are not transmitted over long distance telephone line, and are transmitted at medium or low resolution, and can use the copying service to make up to 500 black-and-white copies a day at all resolutions.

In step S308 the user is allowed access to services/features of the device 6 consistent with the determined level of access. This may be implemented by the access controller 66 through creation of a user interface, which includes selections based on the access policy information obtained for the particular user. Accordingly, the device 6 creates a customized user interface such as a customized service menu for the user that incorporates the access policy for the user. The customized service menu is then displayed on the device 6 with services/features appearing as virtual keys on the I/O unit 76.

FIGS. 5-9 are views of the display screen 10 showing changes in a UI at various stages of a walk-up user's interaction with the device 6.

Figure 5:
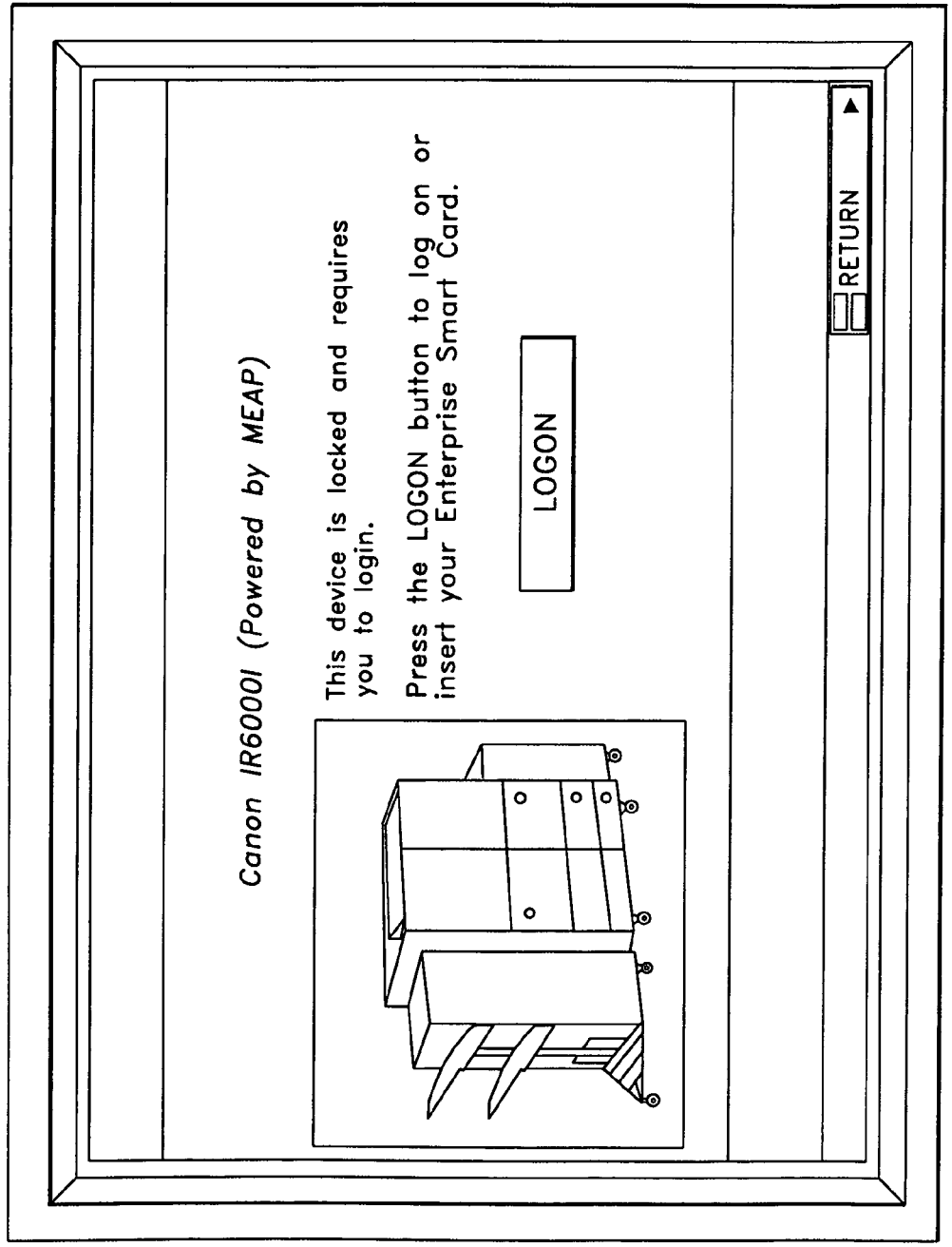
FIG. 5 is a screen shot of the display screen showing a UI at a stage prior to walk-up user login to the device.

FIG. 5 is a screen shot of the display screen showing a UI before user seeks access to the device 6. As indicated, the device is locked and requires the walk-up user to log in.

Figure 6:
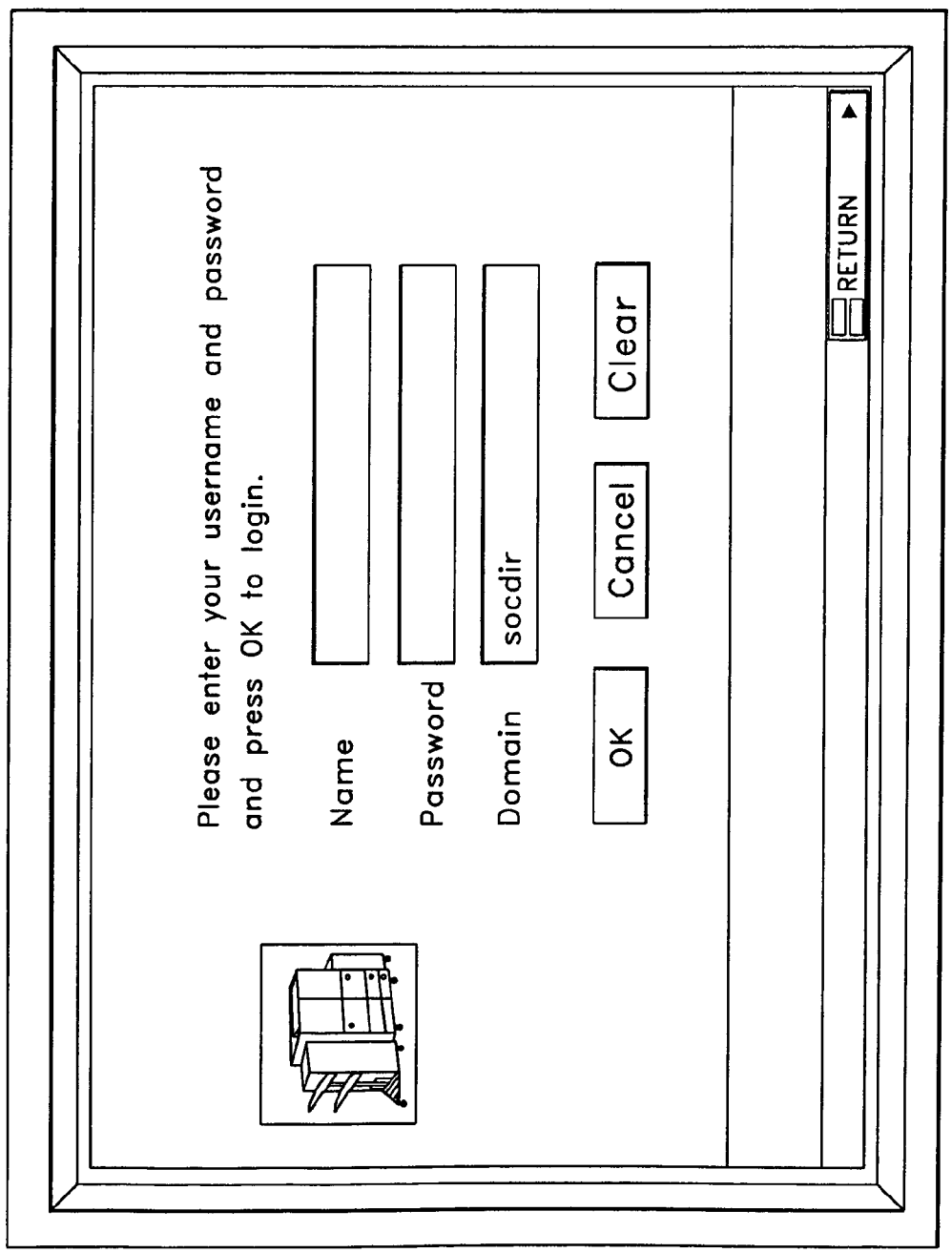
FIG. 6 is a screen shot of the display screen showing a UI through which a walk-up user would log into the device.

FIG. 6 is a screen shot of the display screen showing a UI through which user would log in to the device 6. In the example of FIG. 6, the user logs in by providing a username and password, which are transmitted in a secure manner to server 8.

Figure 7:
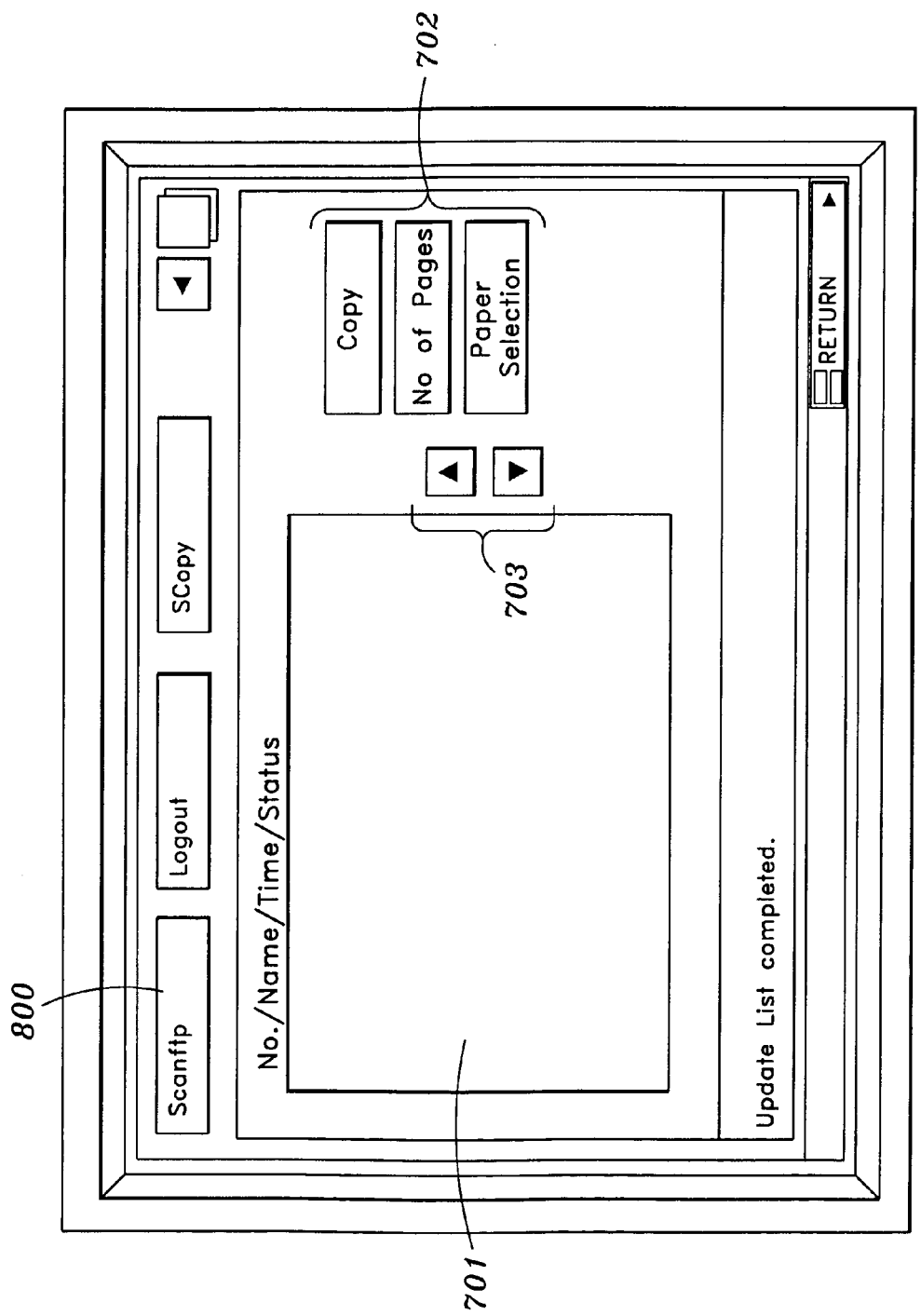
FIG. 7 is a screen shot of the display screen showing a customized service menu corresponding to services/features available to a walk-up user.

FIG. 7 is a screen shot of the display screen showing a customized service menu corresponding to services/features available to a walk-up user. Buttons 800 at the top of the screen are preferably virtual (i.e., non-physical) buttons. In this case, they represent the services of device 6 that are available to the user (i.e., scanftp, logout, scopy). The portion below buttons 800 is area 701, which is a display of a job corresponding to the "scopy" service. The scopy service allows the user to scan and copy using device 6. The virtual buttons 702 on the right hand side of the screen correspond to available features (copy, number of pages, paper selection). That is, the user can copy, set the number of pages and select paper using buttons 702. Scroll buttons 703 allow the user to scroll through the job listings displayed in area 701.

Figure 8:
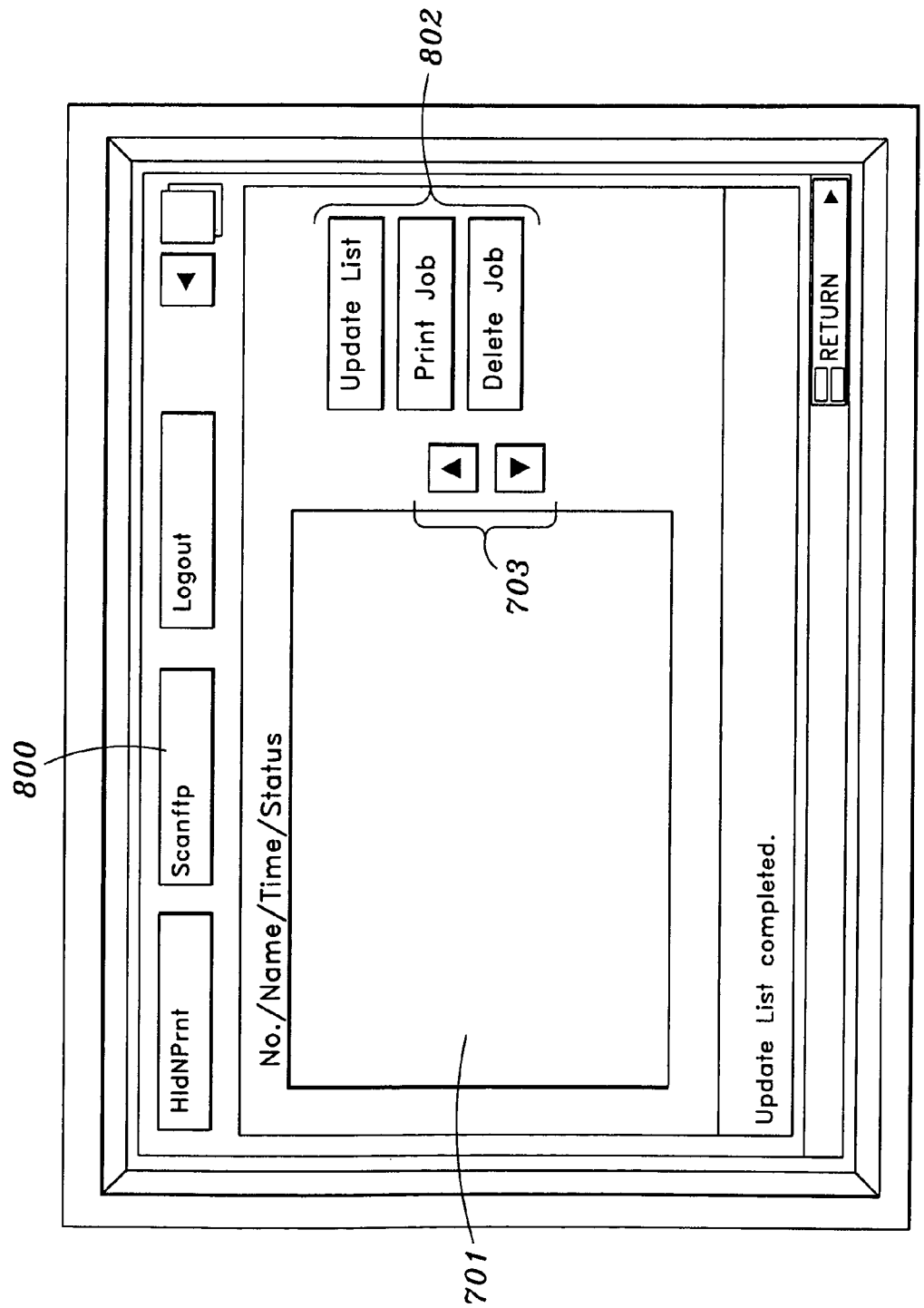
FIG. 8 is a screen shot of the display screen showing another customized service menu corresponding to services/features available to a walk-up user.

FIG. 8 is a screen shot of the display screen showing another example of a customized service menu corresponding to services/features available to a walk-up user. In the example of FIG. 8, area 701 corresponds to an "Hold&Print" service of the device 6 and provides a list of "Hold&Print" jobs. The screen includes buttons 800, which, in this case, correspond to the "Hold & Print", "Scan FTP", and "Logout" services of device 6. The "Hold&Print" service allows the user to store-up print jobs and to initiate printing of a stored job at device 6. The virtual buttons 802 on the right hand side of the screen correspond to available features (update list, print job and delete job). That is, the user can update/refresh list, print a job, or delete a job using buttons 802. Scroll buttons 703 allow the user to scroll through the job listing displayed in area 701.

Figure 9:
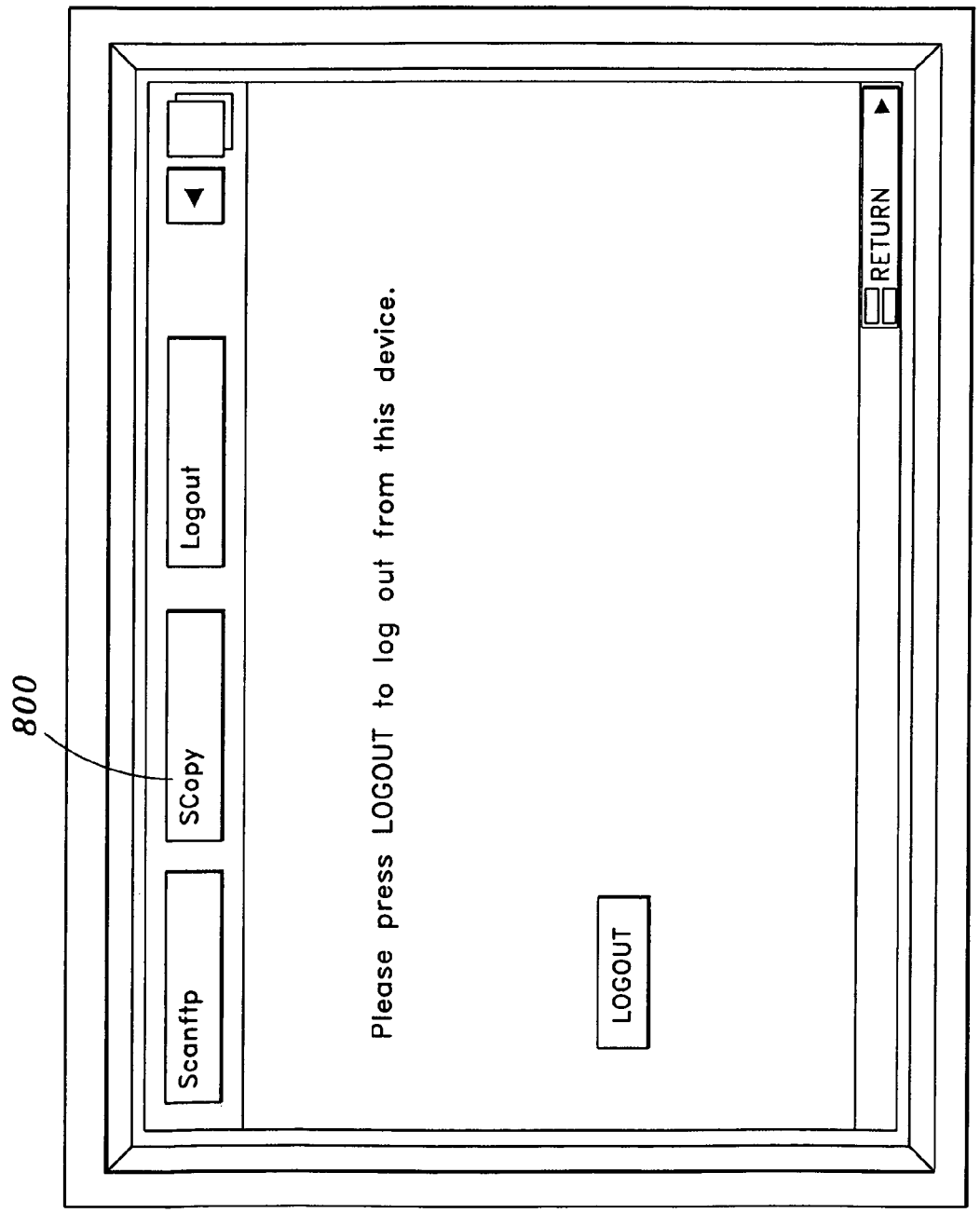
FIG. 9 is a screen shot of the display screen showing a UI through which walk-up user would log out of the device.

FIG. 9 is a screen shot of the display screen showing a UI though which walk-up user would log out of the device 6. Similar to FIG. 8, the screen includes buttons 800, which, in this case, correspond to the "Scan FTP", "scopy", and "Logout" services of device 6.

In a case that the UI includes "unauthorized" selections, these selections may be disables such that the keys corresponding to unauthorized services/features are grayed out. The user then proceeds to use the device 6 in accordance with the determined level of access by activating non-grayed out keys that are displayed on the I/O unit 76 preferably through a touch screen.

Figure 10:
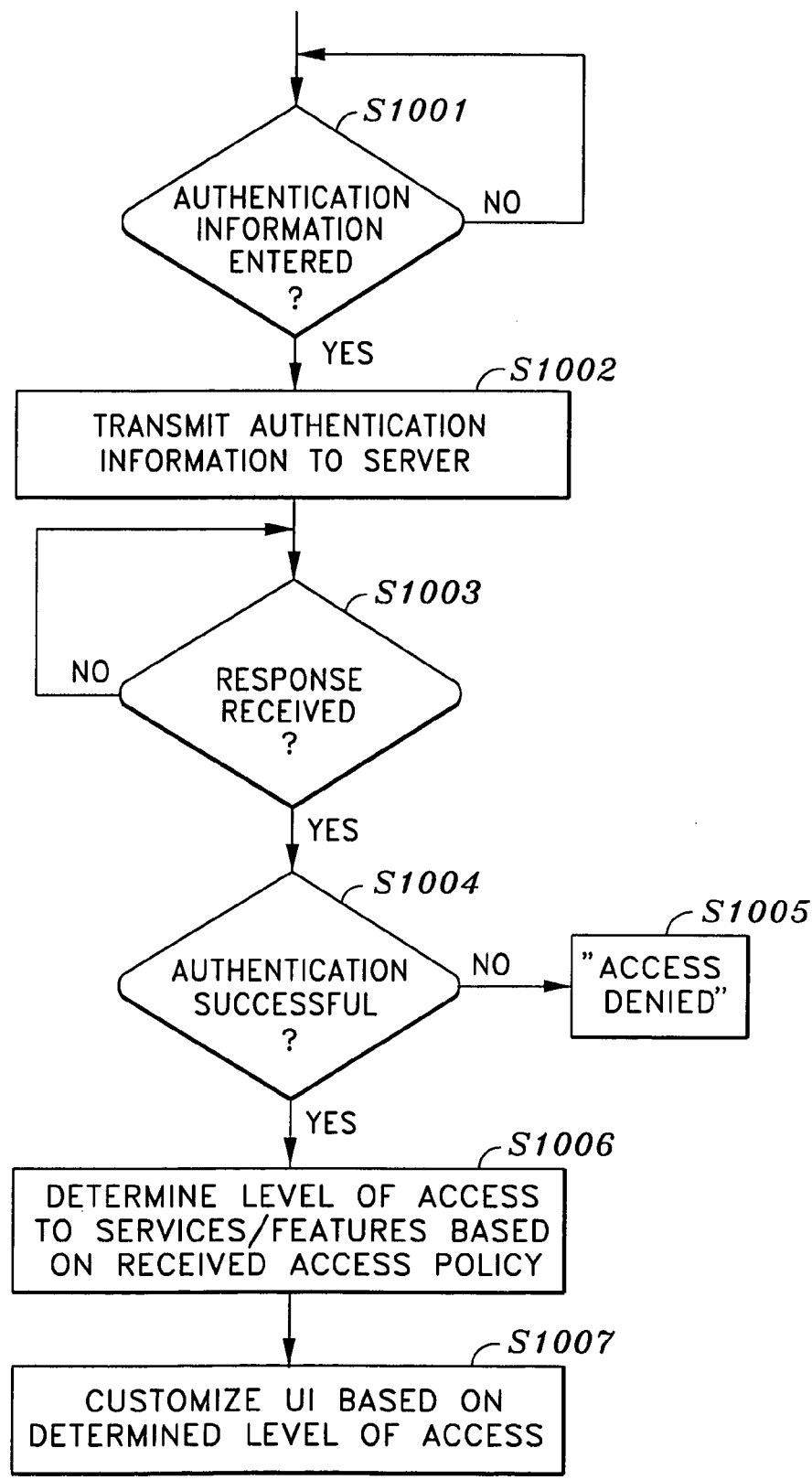
FIG. 10 illustrates a flow diagram of process steps of a networked peripheral device to manage and/or control access to the device by a walk-up user according to the present invention.

FIG. 10 illustrates a flow diagram of process steps of a networked peripheral device to manage and/or control access to the device by a walk-up user according to the present invention. In step S1001 the device 6 inquires into whether user has provided authentication information to the device 6 (e.g., authentication information received via the screen depicted in FIG. 6.) A job is not initiated by the device until such information is provided by the user.

Step S1002 causes the authentication information entered by user in step S1001 to be forwarded to authenticator 48. The authenticator 48, compares or tests the authentication information provided by the user against access policy information that is stored in the directory service 47, and transmits the results back to the device 6. At step S103, device 6 awaits the results from the server 8. Step S1004 inquires into the user's success in being authenticated by the authenticator 48 based on the results received from server 8.

Should the user be unsuccessful in obtaining authentication, step S1005 causes an "access denied" message to be displayed by the device 6, thus denying the user access to any service/features of the device 6. In case of successful authentication by the user for the job requested, the device 6 determines the user's level of access to the services/features of the device 6 based on the received access policy information per step S1006. Step S1007 causes the device 6 to create a customized menu for the user based on the determined level of access.

A remote user may access device 6, for example, via a workstation such a computing equipment 1. However, the process in which a remote user accesses device 6, differs from that of a walk-up user. The following example concerns a remote user who seeks to print a job using device 6 from a workstation and an application that exists on the workstation.

1. The user initiates a print operation from within the application.
2. Device 6 determines the server 8 on which the authenticator 48 is running on.
3. A secure pipe is created between the print driver and the authenticator 48, in which the authentication information is sent to server 8.
4. The device driver 54 on the workstation transmits a request to server 8 for access policy information. The request identifies the user and device 6. Driver also provides authentication in conjunction with the request.
5. Authenticator 48 performs authentication and based on the outcome of authentication transmits a response (e.g., "access denied" or access policy information) to device 6.
6. Driver forwards the received access policy information to device 6 along with the job submitted by the user.

Figure 11:
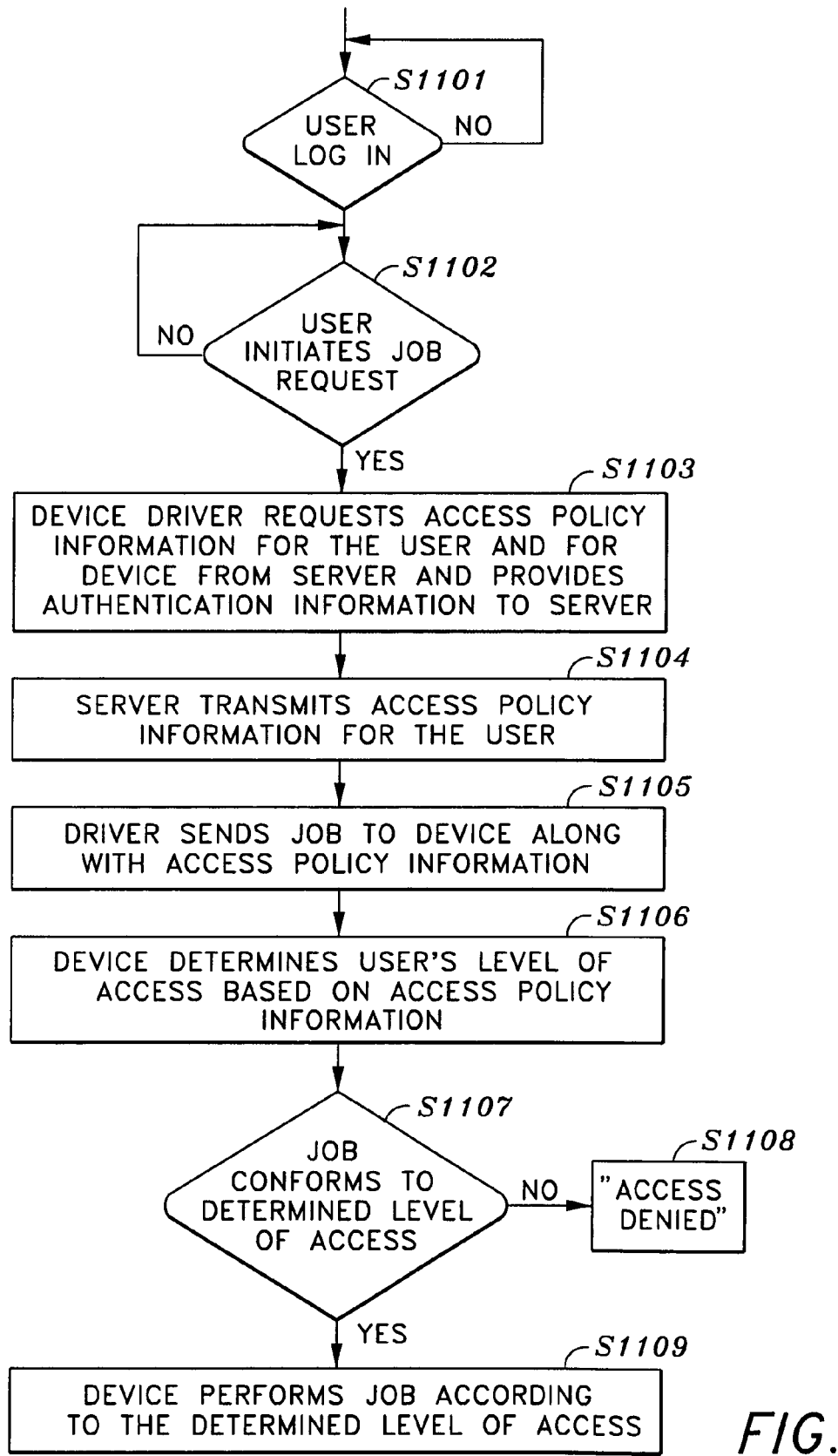
FIG. 11 illustrates a flow diagram of process steps to manage and/or control access to a networked peripheral device by a remote user according to the present invention.

FIG. 11 illustrates a flow diagram of process steps to manage and/or control access to a networked peripheral device by a remote user according to the present invention. The user logs into the network 7 in step S1101. At step S1102 a determination is made as to whether user has initiated a job request. Once the job request is initiated, device driver 54 requests access policy information that corresponds with the user and for device from sever 8 and provides authentication information to the server 8, per step S1103. Authentication information is preferably provided via a challenge and response mechanism, but can also be provided through other means such as user's username and password.

In step S1104, the server 8 sends access policy information back to the driver. Step S1105 causes the driver to forward the access policy information along with the job request to the device 6. In step S1106, the device 6 determines the user's level of access based on the received access policy information. In step S1107, the device 6 compares or tests the requested services/features against the user's level of access to determine whether the user's request conforms to the user's level of access.

A determination that the user's job request does not conform to the user's determined level of access, results in an "access denied" condition, per step S1108, thus denying the user's job request. Preferably, a message is sent to the user's workstation to alert the user of the "access denied" condition. Should the inquiry in step S1107 result in the determination that the user's job request does conform to the user's determined level of access, then step S1109 causes the device 6 to perform the requested job in accordance with the determined level of access.

Figure 12:
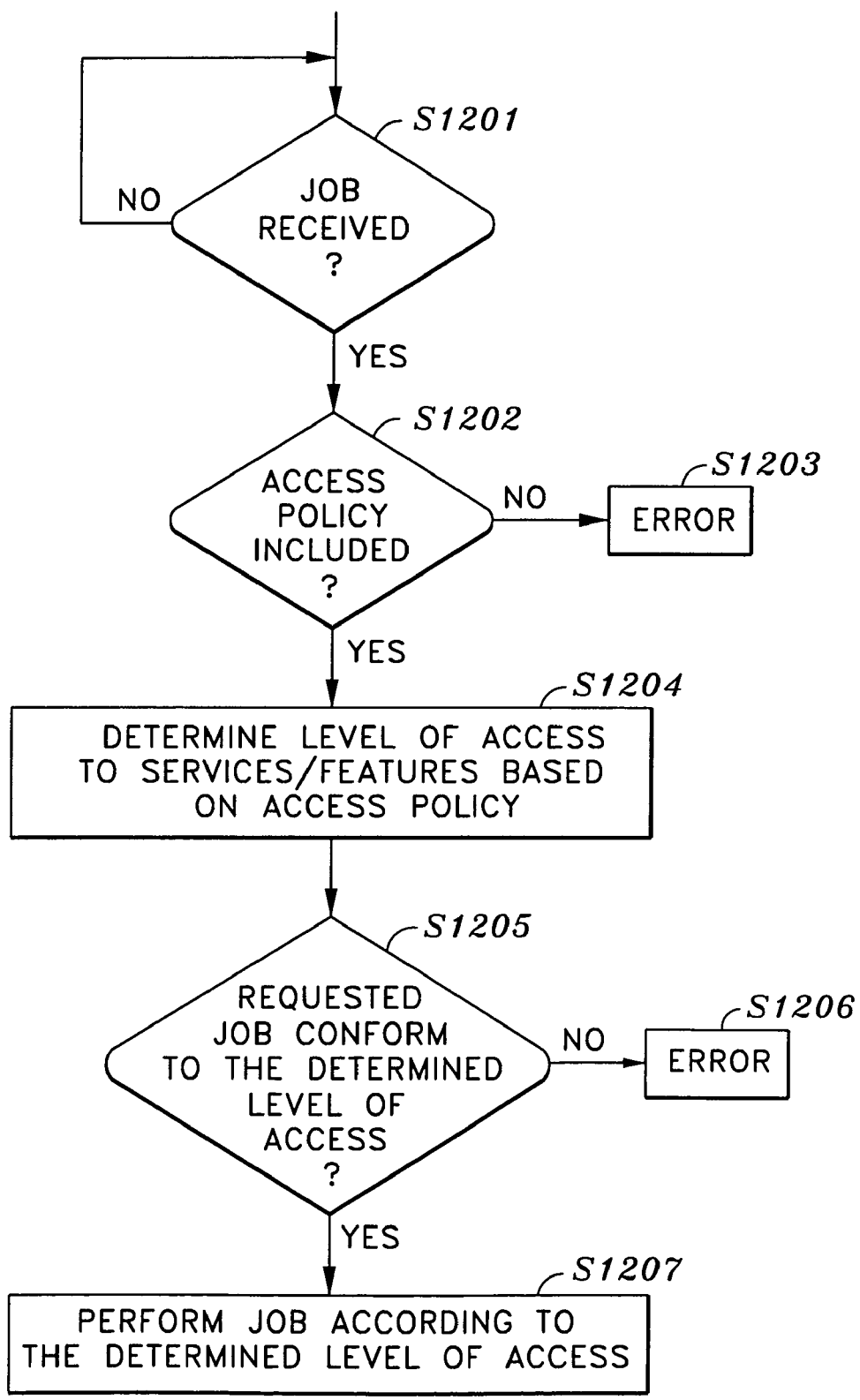
FIG. 12 illustrates a flow diagram of process steps of a networked peripheral device to manage and/or control access to the device by a remote user according to the present invention.

FIG. 11 provides a general overview of steps performed to control/manage access to device 6. FIG. 12 illustrates the perspective of device 6. That is, FIG. 12 illustrates a flow diagram of process steps for a networked peripheral device to manage and/or control access to the device by a remote user according to the present invention. In order to process a job that is remotely sent to a device 6, the device 6 needs to have both the requested services/features and the access policy information for the user. The job that is submitted by the user identifies the requested services/features. Device driver 54 provides the access policy information, which it received from server 8 as part of the job stream sent to device 6.

In step S1201, device driver 54 forwards the user's job to the device 6. The device 6, per step S1202, asks whether the user's access policy information is included along with the job request. If user's access policy information is not included along with the job request, then step S1203 causes an error message to be sent back to the driver 54, denying the user access to the requested services/features.

If the user's access policy information is included along with the job request, then step S1204 proceeds to determine the user's level of access based on the received access policy information. In step S1205, the device 6 compares or tests the requested services/features against the user's level of access to determine whether the user's request conforms to the user's level of access. A determination that the user's job request does not conform to the user's determined level of access, results in an error message, per step S1206, that is sent to driver 54, thus denying the user's job request. Should the inquiry in step S1205 result in the determination that the user's job request does conform to the user's determined level of access, then step S1207 causes the device 6 to perform the requested job.

Server 8 is configured to provide access policy information for a walk-up user and preferably for all enterprise users (i.e., walk-up and remote users) once the user has been authenticated by server 8.

Figure 13:
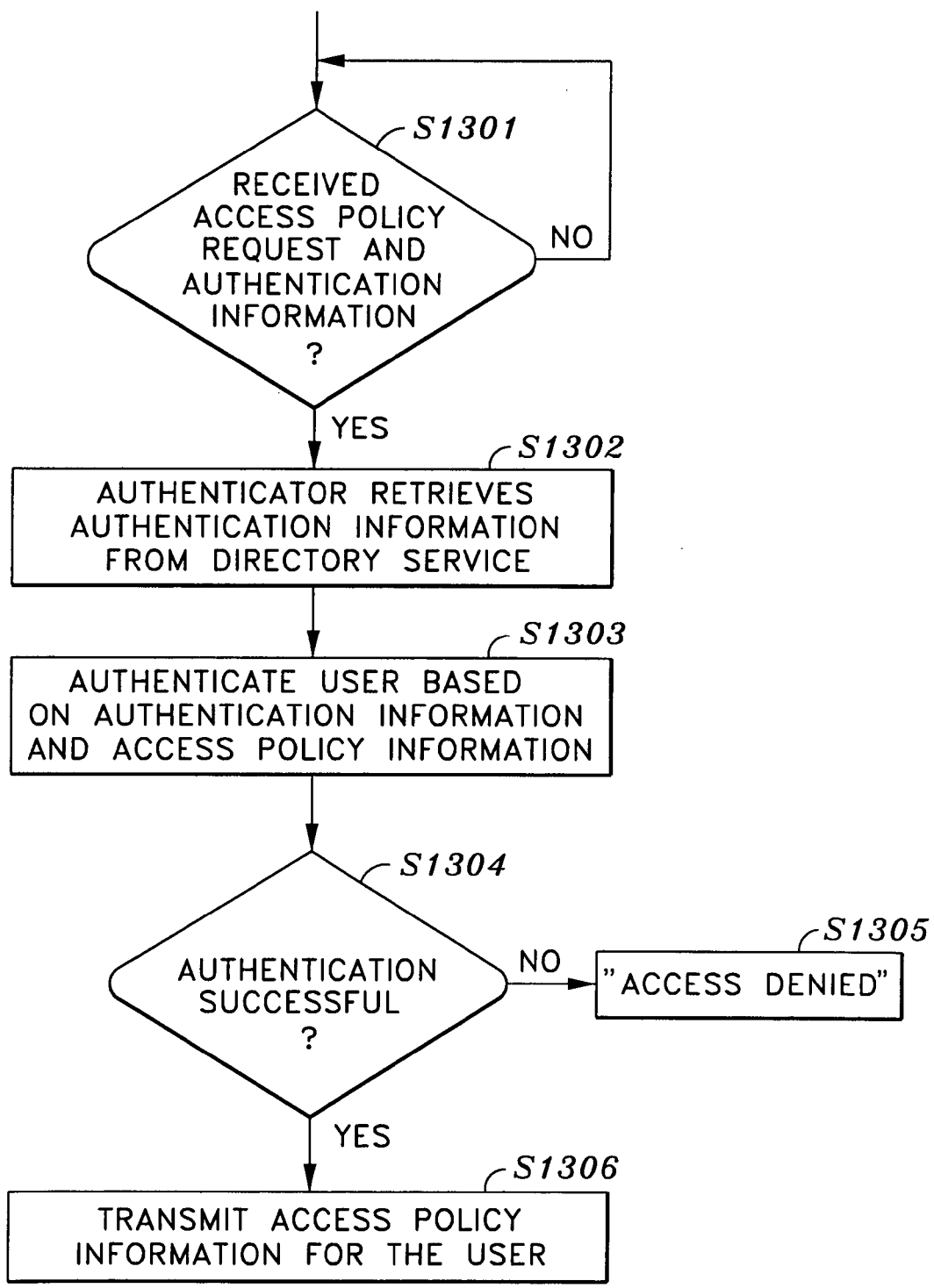
FIG. 13 illustrates a flow diagram of process steps of a server to manage and/or control access to the device by a remote user or a walk-up user according to the present invention.

FIG. 13 illustrates a flow diagram of process steps of a server to manage and/or control access to the device by a remote user or walk-up user according to the present invention. In step S1301, server 8 awaits an access policy request and authentication information from the device 6 or driver 54. In step S1302 the authenticator 48, located on the server 8, retrieves authentication information from directory service 47. In step S1303, the retrieved information is compared or tested against the user authentication information received per step S1301. Step S1304 inquires into whether user has been successfully authenticated. If the user is unsuccessful in obtaining authentication then step S1305 causes an "access denied" message to be sent from the server 8. If the user is successfully authenticated, access, then step S1306 causes user's access policy information to be sent from the server 8.

Server 8 may reside locally with respect to device 6, computing equipment 1, or both. In a case that the network 7 is the Internet, for example, server 8 may be remotely located with respect to device 6, computing equipment 1, or both. Even where server 8 is local, it may be preferable to use a trusted architecture in which access policy information, that is received from server 8 can be trusted.

While the invention is described above with respect to what is currently considered its preferred embodiment, it is to be understood that the invention is not limited to that described above. To the contrary, the invention is intended to cover various modifications and equivalent arrangements within the spirit and scope of the appended claims.

What is claimed is:

1. A peripheral device for controlling use of a plurality of features and/or services of a peripheral device by a user, the plurality of services including at least one of a printer service, a scanner service, a facsimile service and a copy service, the peripheral device comprising:
   a reception unit configured to receive, from a computer, authentication information corresponding to a user;
   an authentication unit configured to authenticate the user using the received authentication information; and
   a transmission unit configured to transmit, to the computer, access management information which specifies a feature and/or a service of the peripheral device available to the authenticated user from among the plurality of features and/or services of the peripheral device, or which specifies a feature and/or a service of the peripheral device not available to the authenticated user from among the plurality of features and/or services of the peripheral device,
   wherein a job is transmitted from the computer to the peripheral device after the access management information is transmitted to the computer,
   wherein the access management information is used for determining whether the user can use a feature and/or a service of the peripheral device necessary to perform the job.

2. A peripheral device according to claim 1, wherein the transmission unit does not transmit the access management information to the computer if authentication by the authentication unit is not successful.

3. A peripheral device according to claim 1, wherein the access management information is transmitted along with the job from the computer to the peripheral device.

4. A computer which transmits a job to a peripheral device which provides a plurality of features and/or services, the plurality of services including at least one of a printer service, a scanner service, a facsimile service and a copy service, the computer comprising:
   a reception unit configured to receive, from a peripheral device, access management information which specifies a feature and/or a service of the peripheral device available to a user from among the plurality of features and/or services of the peripheral device, or which specifies a feature and/or a service of the peripheral device not available to the user from among the plurality of features and/or services of the peripheral device; and
   a transmission unit configured to transmit a job to the peripheral device after the access management information is received,
   wherein the access management information is used for determining whether the user can use the feature and/or a service of a peripheral device necessary to perform the job.

5. A computer according to claim 4, further comprising:
   a second transmission unit configured to transmit, to the peripheral device, authentication information corresponding to the user,
   wherein the access management information is transmitted from the peripheral device to the computer based on a result of authentication using the authentication information.

6. A computer according to claim 4, wherein said transmission unit transmits the received access management information along with the job to the peripheral device.

7. A control method in a peripheral device for controlling use of a plurality of features and/or services of a peripheral device by a user, the plurality of services including at least one of a printer service, a scanner service, a facsimile service and a copy service, the control method comprising:
   receiving, from a computer, authentication information corresponding to a user;
   authenticating the user using the received authentication information; and
   transmitting, to the computer, access management information which specifies a feature and/or a service of the peripheral device available to the authenticated user from among the plurality of features and/or services of the peripheral device, or which specifies a feature and/or a service of the peripheral device not available to the authenticated user from among the plurality of features and/or services of the peripheral device,
   wherein a job is transmitted from the computer to the peripheral device after the access management information is transmitted to the computer,
   wherein the access management information is used for determining whether the user can use a feature and/or a service of the peripheral device necessary to perform the job.

8. A control method according to claim 7, wherein the access management information is not transmitted from the peripheral device to the computer if the authentication is not successful.

9. A control method according to claim 7, wherein the access management information is transmitted along with the job from the computer to the peripheral device.

10. A control method in a computer which transmits a job to a peripheral device which provides a plurality of features and/or services, the plurality of services including at least one of a printer service, a scanner service, a facsimile service and a copy service, the method comprising:

receiving, from the peripheral device, access management information which specifies a feature and/or a service of the peripheral device available to a user from among the plurality of features and/or services of the peripheral device, or which specifies a feature and/or a service of the peripheral device not available to the user from among the plurality of features and/or services of the peripheral device; and transmitting a job to the peripheral device after the access management information is received, wherein the access management information is used for determining whether the user can use a feature and/or a service of the peripheral device necessary to perform the job.

11. A control method according to claim 10, further comprising:

transmitting, to the peripheral device, authentication information corresponding to the user, wherein the access management information is transmitted from the peripheral device to the computer based on a result of authentication using the authentication information.

12. A control method according to claim 10, wherein the received access management information is transmitted along with the job to the peripheral device.

* * * * *